US010259342B2

(12) United States Patent
Oyanagi et al.

(10) Patent No.: US 10,259,342 B2
(45) Date of Patent: Apr. 16, 2019

(54) VEHICLE

(71) Applicant: Toyota Jidosha Kabushiki Kaisha, Toyota-shi, Aichi-ken (JP)

(72) Inventors: Hiroyuki Oyanagi, Toyota (JP); Tatsuhiko Hayashi, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 73 days.

(21) Appl. No.: 15/583,177

(22) Filed: May 1, 2017

(65) Prior Publication Data
US 2017/0327003 A1 Nov. 16, 2017

(30) Foreign Application Priority Data

May 13, 2016 (JP) ................................ 2016-096682

(51) Int. Cl.
*B60L 15/20* (2006.01)
*B60L 11/18* (2006.01)
(Continued)

(52) U.S. Cl.
CPC ............ *B60L 15/20* (2013.01); *B60L 11/1803* (2013.01); *B60L 11/1859* (2013.01); *H02M 3/158* (2013.01); *H02M 7/537* (2013.01); *B60L 2210/40* (2013.01); *B60L 2220/14* (2013.01); *B60L 2220/42* (2013.01); *H02M 7/53871* (2013.01); *H02M 2001/007* (2013.01); *H02M 2001/0025* (2013.01); *H02M 2001/0035* (2013.01); *H02M 2001/0048* (2013.01); *H02P 27/06* (2013.01); *Y02T 10/644* (2013.01); *Y02T 10/645* (2013.01); *Y02T 10/646* (2013.01);
(Continued)

(58) Field of Classification Search
CPC .. B60L 15/20; B60L 11/1859; B60L 11/1803; B60L 2220/14; B60L 2210/40; H02M 7/537; H02M 3/158; H02M 2001/007; H02M 7/53871; H02M 2001/0025; H02M 2001/0035; H02M 2001/0048; Y10S 903/906; H02P 27/06
See application file for complete search history.

(56) References Cited

U.S. PATENT DOCUMENTS 6,088,250 A * 7/2000 Siri .................... H02J 1/102
320/133
2012/0069613 A1 3/2012 Nakagawa
(Continued)

FOREIGN PATENT DOCUMENTS

JP 2015-122874 A 7/2015
WO 2010143511 A1 12/2010

*Primary Examiner* — Mussa A Shaawat
(74) *Attorney, Agent, or Firm* — Dinsmore & Shohl LLP

(57) ABSTRACT

An overall loss L during non-execution of intermittent boosting (in ordinary boosting) is calculated from losses L1 and L2 of motors and a loss LC of a boost converter during non-execution of intermittent boosting. The overall loss L during execution of intermittent boosting is calculated from the losses L1 and L2 of the motors and the loss LC of the boost converter during execution of intermittent boosting. A minimum loss-time boosting voltage Vtmp at which the overall loss L provides a minimum loss Ltmp is set to a target voltage VH*. The boost converter is then controlled in a control state corresponding to the minimum loss-time boosting voltage Vtmp.

3 Claims, 9 Drawing Sheets

(51) Int. Cl.
*H02M 7/537* (2006.01)
*H02P 27/06* (2006.01)
*H02M 3/158* (2006.01)
H02M 7/5387 (2007.01)
H02M 1/00 (2006.01)

(52) U.S. Cl.
CPC .......... *Y02T 10/7005* (2013.01); *Y02T 10/705* (2013.01); *Y02T 10/7241* (2013.01); *Y02T 10/7275* (2013.01); *Y02T 10/92* (2013.01); *Y10S 903/906* (2013.01)

(56) References Cited

U.S. PATENT DOCUMENTS

2016/0318404 A1* 11/2016 Kumazawa ......... B60L 11/1807
2017/0036554 A1* 2/2017 Kumazawa ........... B60L 3/0023

* cited by examiner

VEHICLE

CROSS-REFERENCE TO RELATED APPLICATIONS

This application claims priority to Japanese Patent Application No. 2016-096682 filed May 13, 2016, the contents of which is incorporated herein by reference

TECHNICAL FIELD

The present disclosure relates to vehicle.

BACKGROUND

A proposed vehicle includes a motor for driving and a boost converter configured to step up a voltage of a battery or supply the stepped-up voltage to the motor, and is configured to control the boost converter in either of a control mode that continuously operates the boost converter and a control mode that intermittently operates the boost converter, so as to reduce a power loss (see, for example, Patent Literature 1).

CITATION LIST

Patent Literature

PTL 1: JP2015-122874

SUMMARY

The disclosure of the above proposed vehicle, however, fails to describe that execution or non-execution of intermittent operation of the boost converter or a target voltage of the boost converter is determined based on a total loss including a loss other than the loss of the boost converter. Accordingly an overall loss of the entire system including the loss of the boost converter is likely to be not minimized. There is accordingly a demand for a further reduction of the loss.

An object of the vehicle of the disclosure is mainly to ensure a further reduction of a loss in the configuration that a boost converter is permitted to operate intermittently.

In order to achieve the object described above, the vehicle of the present disclosure may be implemented by the following aspects.

The vehicle of this aspect includes at least one motor for driving; a battery; a boost converter configured to step up a voltage of the battery and supply the stepped-up voltage to the motor; and a controller programmed to control the boost converter that the boost converter makes a boosting voltage equal to a target voltage in either of a control state that performs intermittent boosting to intermittently operate the boost converter and a control state that continuously operates the boost converter and does not perform the intermittent boosting, wherein the controller sets a minimum loss-time boosting voltage at which an overall loss reaches a minimum, to the target voltage and controls the boost converter in a control state corresponding to the minimum loss-time boosting voltage, based on the overall loss that includes a loss of the motor at a target drive point and a loss of the boost converter during non-execution of the intermittent boosting and the overall loss during execution of the intermittent boosting.

The controller of this aspect sets the minimum loss-time boosting voltage at which the overall loss reaches the minimum, to the target voltage and controls the boost converter in the control state corresponding to the minimum loss-time boosting voltage, based on the overall loss that includes the loss of the motor at the target drive point and the loss of the boost converter during non-execution of the intermittent boosting and the overall loss during execution of the intermittent boosting. This configuration controls the boost converter at the target voltage that is set to minimize the overall loss that includes the loss of the motor as well as the loss of the boost converter. This ensures a further reduction of the loss in the configuration that the intermittent boosting of the boost converter is permitted. For example, the loss of the motor may be determined, based on a relationship between the boosting voltage and the loss determined in advance with respect to each drive point of the motor. The loss of the boost converter during non-execution of the intermittent boosting may be determined, based on a relationship between the boosting voltage and the loss determined in advance with respect to each value of electric current flowing through a reactor included in the boost converter. The loss of the boost converter during execution of the intermittent boosting may be determined, based on a relationship between the boosting voltage and the loss during execution of the intermittent boosting. The "target drive point" herein denotes a drive point specified by a rotation speed and a target torque of the motor.

DETAILED DESCRIPTION OF EMBODIMENTS

The following describes some aspects of the disclosed subject matter with reference to embodiments.

Figure 1:
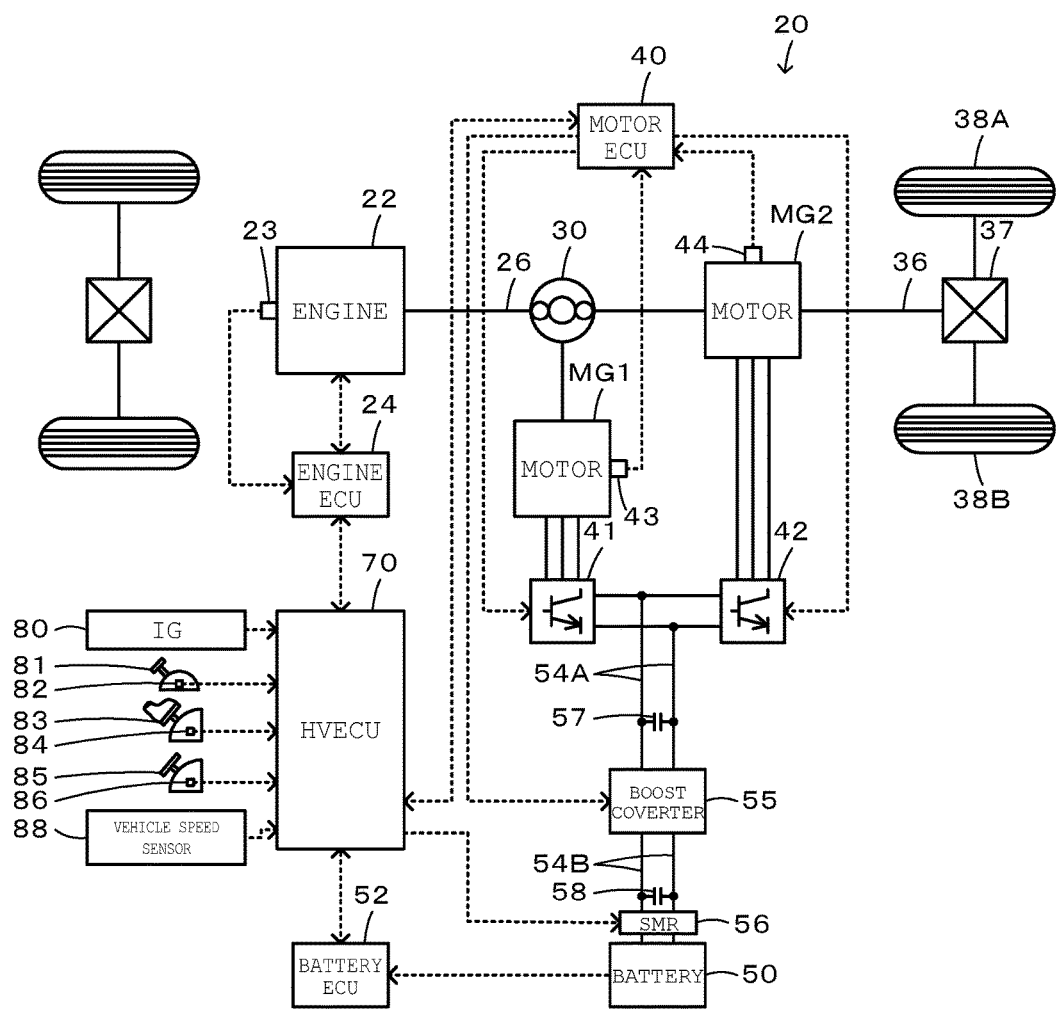
FIG. 1 is a configuration diagram illustrating the schematic configuration of a hybrid vehicle 20 according to one embodiment of the disclosure.
Figure 2:
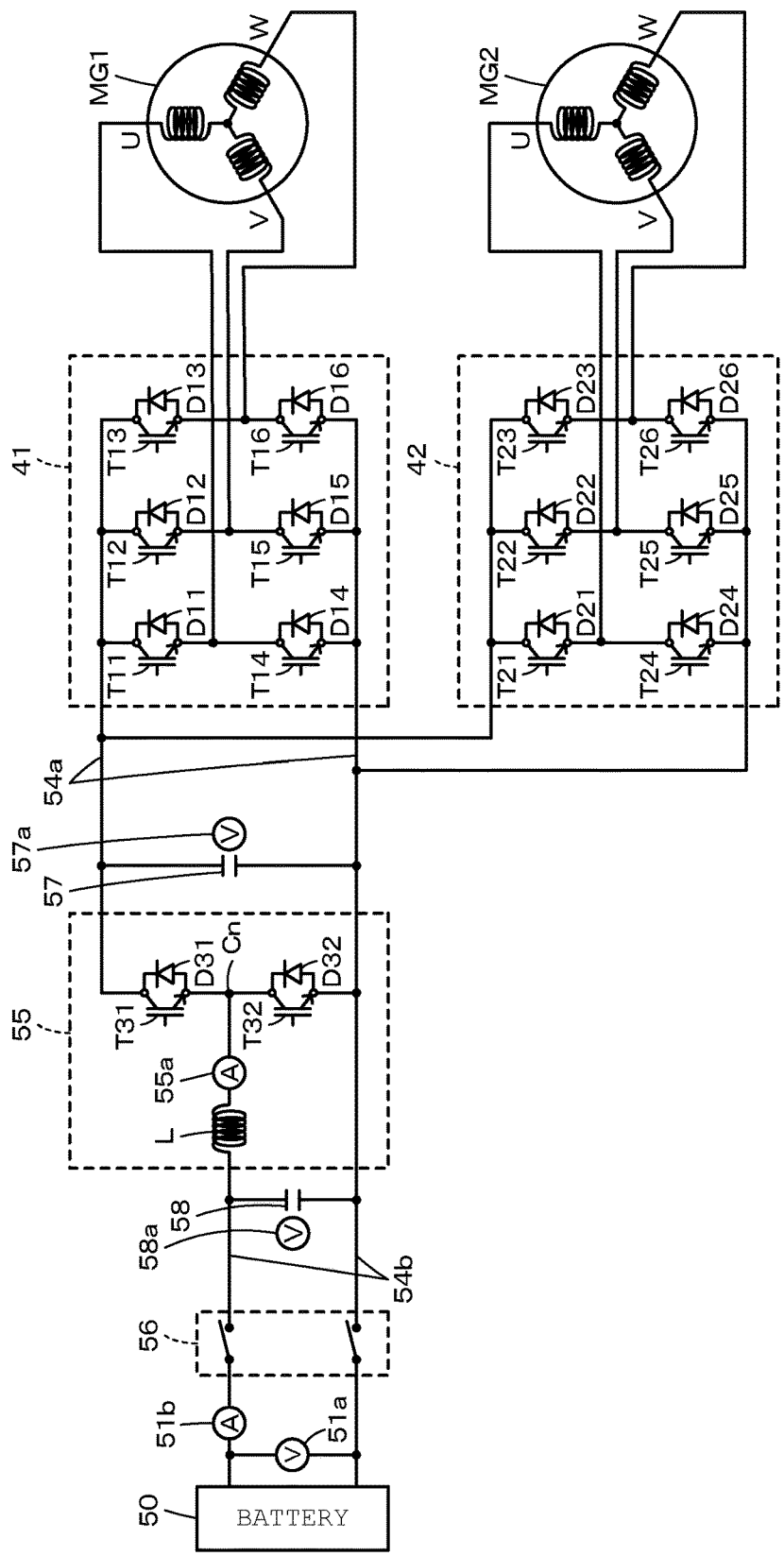
FIG. 2 is a configuration diagram illustrating the schematic configuration of an electrical system including motors MG1 and MG2.

FIG. 1 is a configuration diagram illustrating the schematic configuration of a hybrid vehicle 20 according to one embodiment of the disclosure. FIG. 2 is a configuration diagram illustrating the schematic configuration of a motor drive system including motors MG1 and MG2. As shown in FIG. 1, the hybrid vehicle 20 of the embodiment may include an engine 22, a planetary gear 30, motors MG1 and MG2, inverters 41 and 42, a motor electronic control unit (hereinafter referred to as motor ECU) 40, a battery 50, a battery electronic control unit (hereinafter referred to as battery ECU) 52, a boost converter 55 and a hybrid electronic control unit (hereinafter referred to as HVECU) 70.

The engine 22 is provided as an internal combustion engine configured to output power using, for example, gasoline or light oil as the fuel. This engine 22 is operated and controlled by an engine electronic control unit (hereinafter referred to as engine ECU) 24.

The engine ECU 24 is configured as a CPU-based microprocessor and may include a ROM that stores processing programs, a RAM that temporarily stores data, input and output ports and a communication port other than the CPU, although not being illustrated. Signals from various sensors required for operation control of the engine 22 are input into the engine ECU 24 via the input port. Examples of the signals from various sensors may include:

crank angle θcr from a crank position sensor 23 configured to detect the rotational position of a crankshaft 26 of the engine 22; and a throttle position TH from a throttle valve position sensor configured to detect the position of a throttle valve.

The engine ECU 24 outputs various control signals for operation control of the engine 22 via the output port. Examples of the various control signals may include:

drive control signal to a fuel injection valve;

drive control signal to a throttle motor configured to adjust the position of the throttle valve; and drive control signal to an ignition coil integrated with an igniter.

The engine ECU 24 is connected with the HVECU 70 via the respective communication ports. This engine ECU 24 operates and controls the engine 22 in response to control signals from the HVECU 70. The engine ECU 24 also outputs data regarding the operating conditions of the engine 22 to the HVECU 70 as appropriate. The engine ECU 24 computes a rotation speed of the crankshaft 26, i.e., a rotation speed Ne of the engine 22, based on the crank angle θcr detected by the crank position sensor 23.

The planetary gear 30 is configured as a single pinion-type planetary gear mechanism. The planetary gear 30 includes a sun gear, a ring gear and a carrier that are respectively connected with a rotor of the motor MG1, a driveshaft 36 that is linked with drive wheels 38a and 38b via a differential gear 37, and the crankshaft 26 of the engine 22.

The motor MG1 is configured as a synchronous motor generator including a rotor with permanent magnets embedded therein and a stator with three-phase coils wound thereon. As described above, the rotor of this motor MG1 is connected with the sun gear of the planetary gear 30. Similarly to the motor MG1, the motor MG2 is also configured as a synchronous motor generator including a rotor with permanent magnets embedded therein and a stator with three-phase coils wound thereon. The rotor of this motor MG2 is connected with the driveshaft 36.

The inverter 41 is connected with high voltage power lines 54a. This inverter 41 includes six transistors (switching elements) T11 to T16 and six diodes D11 to D16. The transistors T11 to T16 are arranged in pairs as the source side and the sink side relative to a positive bus bar and a negative bus bar of the high voltage power lines 54a. The six diodes D11 to D16 are respectively connected in a reverse direction in parallel to the transistors T11 to T16. Each of the three-phase coils (U phase, V phase and W phase) of the motor MG1 is connected with a junction point of each pair of transistors among the transistors T11 to T16. The ratio of the on time of the respective pairs of transistors among the transistors T11 to T16 is regulated by the motor ECU 40 under application of a voltage to the inverter 41. This forms a rotating magnetic field in the three-phase coils, and rotates and drives the motor MG1.

Similarly to the inverter 41, the inverter 42 is also connected with the high voltage power lines 54a. Similarly to the inverter 41, the inverter 42 includes six transistors (switching elements) T21 to T26 and six diodes D21 to D26. The ratio of the on time of the respective pairs of transistors among the transistors T21 to T26 is regulated by the motor ECU 40 under application of a voltage to the inverter 42. This forms a rotating magnetic field in the three-phase coils, and rotates and drives the motor MG2.

The boost converter 55 is connected with the high voltage power lines 54a and with low voltage power lines 54b which the battery 50 is connected with. This boost converter 55 includes two transistors (switching elements) T31 and T32, two diodes D31 and D32 and a reactor L. The transistor T31 is connected with the positive bus bar of the high voltage power lines 54a. The transistor T32 is connected with the transistor T31 and with negative bus bars of the high voltage power lines 54a and the low voltage power lines 54b. The two diodes D31 and D32 are respectively connected in a reverse direction in parallel to the transistors T31 and T32. The reactor L is connected with a connection point Cn of the transistors T31 and T32 and with a positive bus bar of the low voltage power lines 54b. The boost converter 55 serves to step up the voltage of the low voltage power lines 54b and supply the stepped-up voltage to the high voltage power lines 54a and serves to step down the voltage of the high voltage power lines 54a and supply the stepped-down voltage to the low voltage power lines 54b by regulating the ratio of the on time of the transistors T31 and T32 by the motor ECU 40.

A high voltage capacitor 57 is connected with the positive bus bar and the negative bus bar of the high voltage power lines 54a. A low voltage capacitor 58 is connected with the positive bus bar and the negative bus bar of the low voltage power lines 54b.

The motor ECU 40 is configured as a CPU-based microprocessor and includes a ROM that stores processing programs, a RAM that temporarily stores data, input and output ports and a communication port other than the CPU, although not being illustrated. Signals from various sensors required for drive control of the motors MG1 and MG2 and the boost converter 55 are input into the motor ECU 40 via the input port. Examples of the signals from various sensors may include:

rotational positions θm1 and θm2 from rotational position detection sensors 43 and 44 configured to detect the rotational positions of the rotors of the motors MG1 and MG2;

phase currents to be applied to the motors MG1 and MG2 detected by current sensors (not shown);

voltage VH of the high voltage capacitor 57 (high voltage power lines 54a) from a voltage sensor 57a that is placed between terminals of the high voltage capacitor 57;

voltage VL of the low voltage capacitor 58 (low voltage power lines 54b) from a voltage sensor 58a that is placed between terminals of the low voltage capacitor 58; and electric current IL of the reactor L (taking a positive value when the electric current flows from the reactor L-side toward the connection point Cn-side) from a current sensor 55a that is placed between the connection point Cn and the reactor L of the boost converter 55.

The motor ECU 40 outputs various control signals for drive control of the motors MG1 and MG2 and the boost converter 55 via the output port. Examples of the various control signals may include:

switching control signals to the transistors T11 to T16 of the inverter 41 and to the transistors T21 to T26 of the inverter 42; and switching control signals to the transistors T31 and T32 of the boost converter 55.

The motor ECU 40 is connected with the HVECU 70 via the respective communication ports. This motor ECU 40 drives and controls the motors MG1 and MG2 and the boost converter 55, in response to control signals from the HVECU 70. The motor ECU 40 also outputs data regarding the driving conditions of the motors MG1 and MG2 and the boost converter 55 to the HVECU 70 as appropriate. The motor ECU 40 computes electrical angles θe1 and θe2 of the rotors of the motors MG1 and MG2 and rotation speeds Nm1 and Nm2 of the motors MG1 and MG2, based on the rotational positions θm1 and θm2 of the rotors of the motors MG1 and MG2.

The battery 50 may be configured, for example, as a lithium ion secondary battery or a nickel metal hydride secondary battery and is connected with the low voltage power lines 54b. This battery 50 is under management of a battery electronic control unit (hereinafter referred to as battery ECU) 52.

The battery ECU 52 may be configured as a CPU-based microprocessor and may include a ROM that stores processing programs, a RAM that temporarily stores data, input and output ports and a communication port other than the CPU, although not being illustrated. Signals from various sensors required for management of the battery 50 are input into the battery ECU 52 via the input port. Examples of the signals from various sensors may include:

battery voltage Vb from a voltage sensor 51a that is placed between terminals of the battery 50;

battery current Ib from a current sensor 51b that is mounted to an output terminal of the battery 50; and battery temperature Tb from a temperature sensor (not shown) mounted to the battery 50.

The battery ECU 52 is connected with the HVECU 70 via the respective communication ports. This battery ECU 52 outputs data regarding the conditions of the battery 50 to the HVECU 70 as appropriate. The battery ECU 52 computes a state of charge SOC of the battery 50, based on an integrated value of the battery current Ib detected by the current sensor 51b. The state of charge SOC of the battery 50 denotes a ratio of power capacity dischargeable from the battery 50 to the total capacity of the battery 50. The battery ECU 52 also computes an input limit Win and an output limit Wout of the battery 50, based on the computed state of charge SOC and the battery temperature Tb detected by the temperature sensor. The input limit Win and the output limit Wout of the battery 50 denote maximum allowable powers to charge the battery 50 and to be discharged from the battery 50.

A system main relay 56 is provided on the battery 50-side of the low voltage capacitor 58 that is connected with the positive bus bar and the negative bus bar of the low voltage power lines 54b. This system main relay 56 connects the battery 50 with the boost converter 55 in an ON position and disconnects the battery 50 from the boost converter 55 in an OFF position.

The HVECU 70 may be configured as a CPU-based microprocessor and may include a ROM that stores processing programs, a RAM that temporarily stores data, input and output ports and a communication port other than the CPU, although not being illustrated. Signals from various sensors are input into the HVECU 70 via the input port. Examples of the signals from various sensors may include:

ignition signal from an ignition switch 80;

shift position SP from a shift position sensor 82 configured to detect the operational position of a shift lever 81;

accelerator position Acc from an accelerator pedal position sensor 84 configured to detect the depression amount of an accelerator pedal 83;

brake pedal position BP from a brake pedal position sensor 86 configured to detect the depression amount of a brake pedal 85; and vehicle speed V from a vehicle speed sensor 88.

The HVECU 70 outputs, for example, a control signal to the system main relay 56 via the output port. The HVECU 70 is connected with the engine ECU 24, the motor ECU 40 and the battery ECU 52 via the communication ports as described above. This HVECU 70 transmits various control signals and data to and from the engine ECU 24, the motor ECU 40 and the battery ECU 52.

The hybrid vehicle 20 of the embodiment having the above configuration is driven in a drive mode, for example, a hybrid drive mode (HV drive mode) or an electric drive mode (EV drive mode). The HV drive mode denotes a drive mode in which the hybrid vehicle 20 is driven with operating the engine 22 and driving the motors MG1 and MG2. The EV drive mode denotes a drive mode in which the hybrid vehicle 20 is driven with driving the motor MG2 and stopping operation of the engine 22.

In the HV drive mode, the HVECU 70 first sets a required torque Tr* that is to be output to the driveshaft 36, based on the accelerator position Acc from the accelerator pedal position sensor 84 and the vehicle speed V from the vehicle speed sensor 88. The HVECU 70 subsequently computes a drive power Pdrv* that is required for driving by multiplying the required torque Tr* by a rotation speed Np of the driveshaft 36. The rotation speed Np of the driveshaft 36 herein may be, for example, the rotation speed Nm2 of the motor MG2 or a rotation speed obtained by multiplying the vehicle speed V by a conversion factor. The HVECU 70 then computes a required power Pe* that is required for the vehicle by subtracting a required charge-discharge power Pb* of the battery 50 (taking a positive value when the battery 50 is discharged) from the computed drive power Pdrv*. The HVECU 70 subsequently sets a target rotation speed Ne* and a target torque Te* of the engine 22 and torque commands Tm1* and Tm2* of the motors MG1 and MG2, such that the required power Pe* is output from the engine 22 and the required torque Tr* is output to the driveshaft 36 within the range of the input limit Win and the output limit Wout of the battery 50. The motor ECU 40 sets a target voltage (voltage command) VH* of the high voltage power lines 54a, such that the motors MG1 and MG2 are respectively driven at target drive points specified by the rotation speeds Nm1 and Nm2 and the toque commands Tm1* and Tm2*. The HVECU 70 then sends such settings to the engine ECU 24 and the motor ECU 40. More specifically, the HVECU 70 sends the target rotation speed Ne* and the target torque Te* of the engine 22 to the engine ECU 24, while sending the torque commands Tm1* and Tm2* of the motors MG1 and MG2 and the target voltage VH* of the high voltage power lines 54a to the motor ECU 40. When receiving the target rotation speed Ne* and the target torque Te* of the engine 22, the engine ECU 24 performs intake air flow control, fuel injection control and ignition control of the engine 22, such that the engine 22 is driven on the basis of the received target rotation speed Ne* and the received target torque Te*. When receiving the torque commands Tm1* and Tm2* of the motors MG1 and MG2 and the target voltage VH* of the high voltage power lines 54a, the motor ECU 40 performs switching control of the transistors T11 to T16 of the inverter 41 and the transistors T21 to T26 of the inverter 42, such that the motors MG1 and MG2 are driven with the torque commands Tm1* and Tm2*. The motor ECU 40 also performs switching control of the transistors T31 and T32 of the boost converter 55, such that the voltage VH of the high voltage power lines 54a becomes equal to the target voltage VH*. In this HV drive mode, for example, when the required power Pe* becomes equal to or less than a stop reference value Pstop, it is determined that a stop condition of the engine 22 is satisfied. The operation of the engine 22 is then stopped, and the drive mode is shifted to the EV drive mode.

In the EV drive mode, the HVECU 70 first sets the required torque Tr* in the same manner as that in the HV drive mode. The HVECU 70 subsequently sets value 0 to the torque command Tm1* of the motor MG1. The HVECU 70 then sets the torque command Tm2* of the motor MG2, such that the required torque Tr* is output to the driveshaft 36 within the range of the input limit Win and the output limit Wout of the battery 50. The HVECU 70 also sets the target voltage VH* of the high voltage power lines 54a in the same manner as that during a run in the HV drive mode, and sends such settings to the motor ECU 40. When receiving the torque commands Tm1* and Tm2* of the motors MG1 and MG2 and the target voltage VH* of the high voltage power lines 54a, the motor ECU 40 performs switching control of the transistors T11 to T16 of the inverter 41 and the transistors T21 to T26 of the inverter 42, such that the motors MG1 and MG2 are driven with the torque commands Tm1* and Tm2*. The motor ECU 40 also performs switching control of the transistors T31 and T32 of the boost converter 55, such that the voltage VH of the high voltage power lines 54a becomes equal to the target voltage VH*. During a run in the EV drive mode, when a start condition of the engine 22 is satisfied, for example, when the required power Pe* computed in the same manner as that during a run in the HV drive mode becomes equal to or greater than a starting reference value Pstart, the engine 22 is started and the drive mode is shifted to the HV drive mode.

According to this embodiment, not only control by ordinary boosting (also called continuous boosting) that continuously performs switching control of the transistors T31 and T32 but control by intermittent boosting may be allowed as the switching control of the boost converter 55. The intermittent boosting herein denotes intermittently performing the boosting operation of the boost converter 55 accompanied with a temporary stop (for example, stop for several tens msec to a hundred and several tens msec) of the switching control of the transistors T31 and T32. This intermittent boosting stops the switching control when the voltage VH of the high voltage power lines 54a becomes equal to the target voltage VH*, and restarts the switching control when a difference between the voltage VH and the target voltage VH* subsequently becomes equal to or greater than a predetermined value. With respect to a predetermined time period including boosting operation terms and stop terms, the intermittent boosting may be likely to reduce a loss caused by the switching control, compared with the ordinary boosting. The intermittent boosting is allowed when the voltage VH is higher than a predetermined intermittent boosting permission voltage Vper. The intermittent boosting permission voltage Vper is a fixed value and may be determined, for example, to be 1.5 to 2 times the voltage VL of the low voltage power lines 54b.

Figure 3:
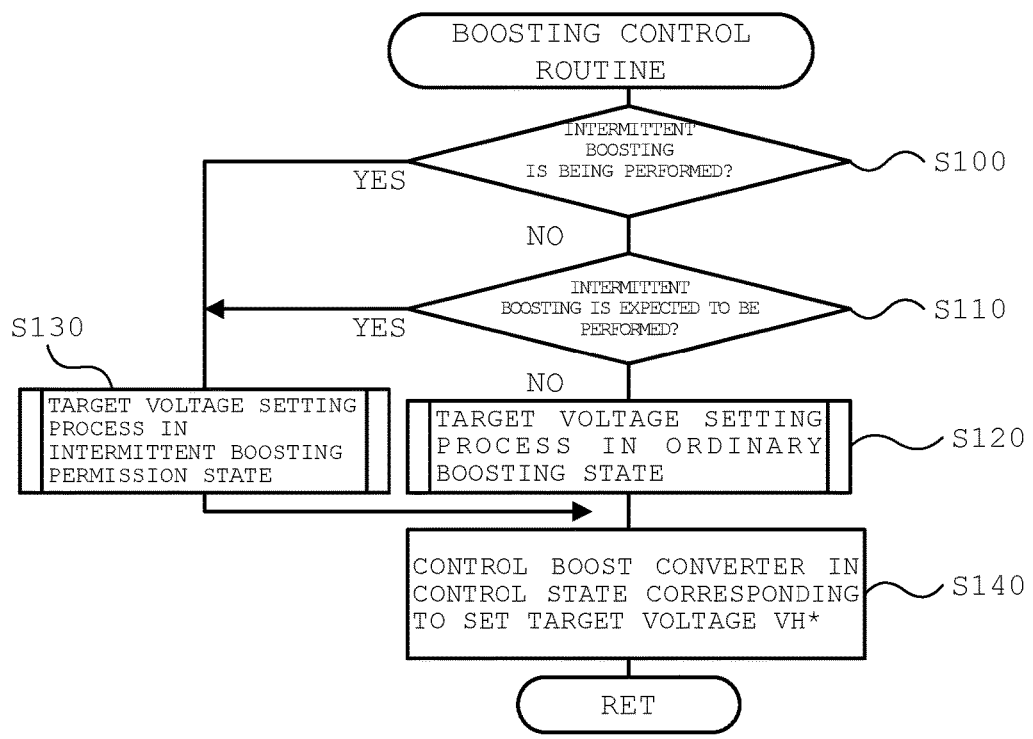
FIG. 3 is a flowchart showing an example of boosting control routine performed by a motor ECU 40.

The following describes the operations of the hybrid vehicle 20 of the embodiment including the above configuration or more specifically series of operations to control the boost converter 55. FIG. 3 is a flowchart showing an example of boosting control routine performed by the motor ECU 40. At the start of the boosting control routine, the motor ECU 40 first determines whether the intermittent boosting is being performed (step S100) and, when the intermittent boosting is not being performed, subsequently determines whether the intermittent boosting is expected to be performed, i.e., whether the intermittent boosting is likely to be performed (step S110). The determination of step S110 may be based on, for example, whether a relatively high voltage is required as the voltage VH of the high voltage power lines 54a in the present state or whether it is likely to provide a relatively large difference between the voltage VH of the high voltage power lines 54a and the voltage VL of the low voltage power lines 54b in the present state. For example, it may be determined that the intermittent boosting is expected to be performed when both an absolute value of power Pm1 of the motor MG1 obtained by multiplying the torque command Tm1* and the rotation speed Nm1 of the motor MG1 and an absolute value of power Pm2 of the motor MG2 obtained by multiplying the torque command Tm2* and the rotation speed Nm2 of the motor MG2 are less than a predetermined power. In another example, it may be determined that the intermittent boosting is expected to be performed when both a variation ΔPm1 of the power Pm1 and a variation ΔPm2 of the power Pm2 are less than a predetermined variation. In another example, it may be determined that the intermittent boosting is expected to be performed when the torque command Tm2* of the motor MG2 is less than a predetermined torque. In another example, it may be determined that the intermittent boosting is expected to be performed when the electric current IL of the reactor L is lower than a predetermined current value. At least one of these determinations may be employed, and a plurality of determinations may be employed in combination.

When it is determined at step S100 that the intermittent boosting is not being performed and it is determined at step S110 that the intermittent boosting is not expected to be performed, the motor ECU 40 performs a target voltage setting process in the ordinary boosting state to set the target voltage VH* of the high voltage power lines 54a (step S120). When it is determined at step S100 that the intermittent boosting is being performed or when it is determined at step S110 that the intermittent boosting is expected to be performed, on the other hand, the motor ECU 40 performs a target voltage setting process in the intermittent boosting permission state to set the target voltage VH* of the high voltage power lines 54a (step S130). The motor ECU 40 then controls the operation of the boost converter 55 in a control state corresponding to the set target voltage VH*, such that the voltage VH of the high voltage power lines 54a becomes equal to the target voltage VH* set in either of the target voltage setting processes (step S140) and terminates the boosting control routine. More specifically, at step S140, the motor ECU 40 performs switching control of the transistors T31 an T32 of the boost converter 55 in the control state corresponding to the set target voltage VH* (execution or non-execution of the intermittent boosting), such that the voltage VH of the high voltage power lines 54a becomes equal to the target voltage VH*. The following sequentially describes the details of the target voltage setting process in the ordinary boosting state and the details of the target voltage setting process in the intermittent boosting permission state.

Figure 4:
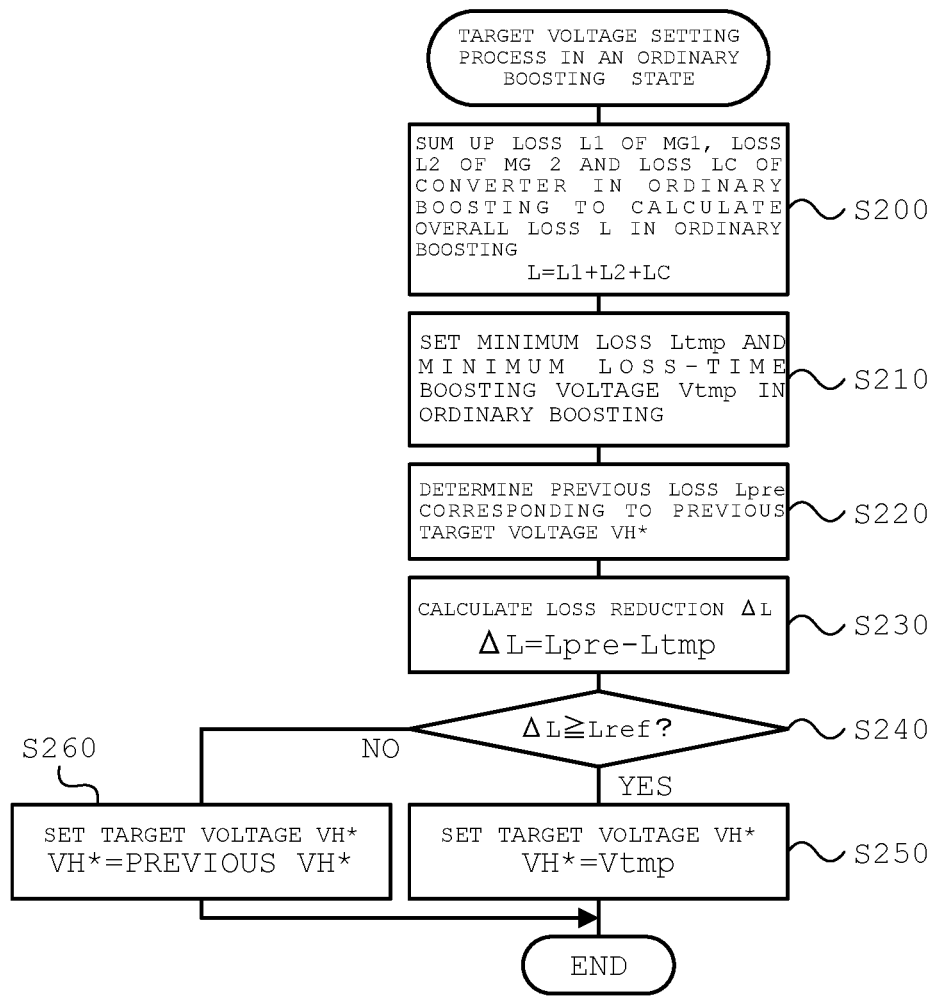
FIG. 4 is a flowchart showing an example of target voltage setting process in an ordinary boosting state.

The details of the target voltage setting process in the ordinary boosting state at step S120 are described first with reference to the flowchart of FIG. 4. In this target voltage setting process in the ordinary boosting state, the motor ECU 40 first sums up a loss L1 of the motor MG1, a loss L2 of the motor MG2 and a loss LC of the boost converter 55 in the ordinary boosting, so as to calculate an overall loss L in the ordinary boosting (step S200). The loss L1 of the motor MG1 includes a loss of the inverter 41 that is used to drive the motor MG1. The loss L2 of the motor MG2 includes a loss of the inverter 42 that is used to drive the motor MG2.

Figure 5:
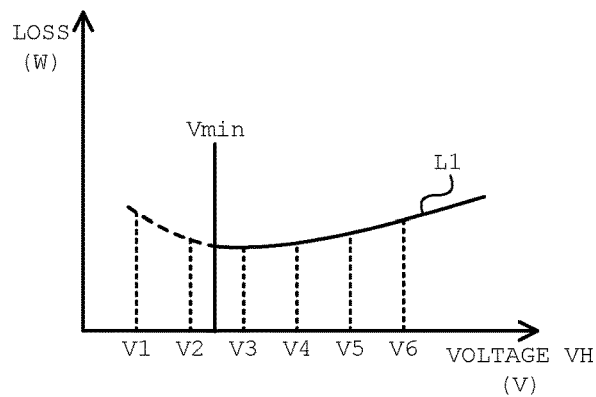
FIG. 5 is a diagram illustrating an example of relationship of the loss L1 of the motor MG1 to the voltage VH.
Figure 6:
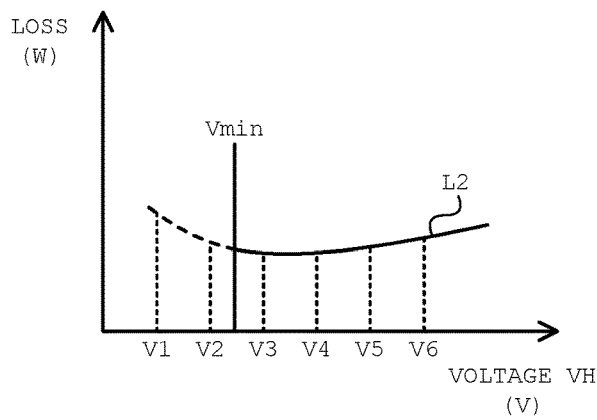
FIG. 6 is a diagram illustrating an example of relationship of the loss L2 of the motor MG2 to the voltage VH.
Figure 7:
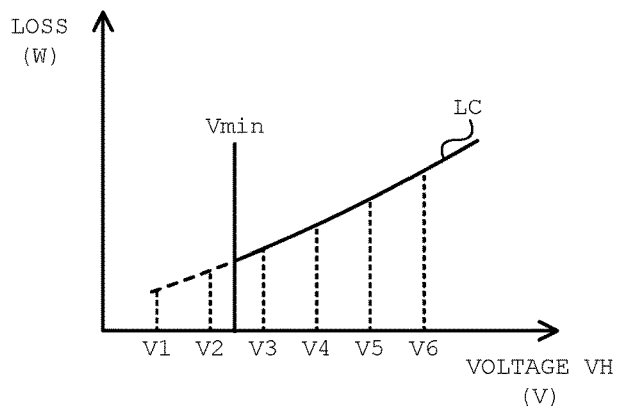
FIG. 7 is a diagram illustrating an example of relationship of the loss LC of a boost converter 55 to the voltage VH in ordinary boosting.
Figure 8:
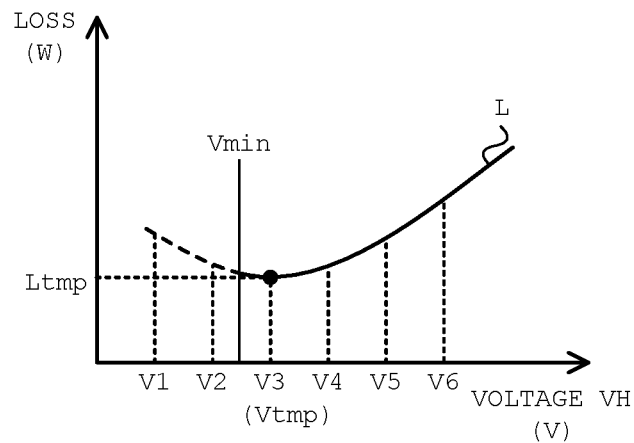
FIG. 8 is a diagram illustrating an example of relationship of the overall loss L to the voltage VH in the ordinary boosting.

FIG. 5 is a diagram illustrating an example of relationship of the loss L1 of the motor MG1 to the voltage VH. FIG. 6 is a diagram illustrating an example of relationship of the loss L2 of the motor MG2 to the voltage VH. FIG. 7 is a diagram illustrating an example of relationship of the loss LC of the boost converter 55 to the voltage VH in the ordinary boosting. FIG. 8 is a diagram illustrating an example of relationship of the overall loss L to the voltage VH in the ordinary boosting. According to this embodiment, a map of the voltage VH and the loss L1 with respect to each drive point of the motor MG1 is determined in advance by experiment or the like and is stored in, for example, the ROM of the motor ECU 40. When a present target drive point of the motor MG1 (specified by the torque command Tm1* and the rotation speed Nm1) is determined, the loss L1 corresponding to each value of the voltage VH is computed and determined from the stored map. Similarly a map of the voltage VH and the loss L2 with respect to each drive point of the motor MG2 is determined in advance by experiment or the like and is stored in, for example, the ROM of the motor ECU 40. When a present target drive point of the motor MG2 (specified by the torque command Tm2* and the rotation speed Nm2) is determined, the loss L2 corresponding to each value of the voltage VH is computed and determined from the stored map. A map of the voltage VH and the loss LC with respect to each value of the electric current IL of the reactor L in the boost converter 55 in the ordinary boosting is determined in advance by experiment or the like and is stored in, for example, the ROM of the motor ECU 40. When a present value of the electric current IL of the reactor L is obtained, the loss LC corresponding to each value of the voltage VH is computed and determined from the stored map. A lower limit drive voltage Vmin shown in each of these diagrams denotes a boosting voltage required to drive each of the motors MG1 and MG2 at its target drive point and may be set corresponding to a voltage determined in advance with respect to each target drive point of each of the motors MG1 and MG2. The loss L1 of the motor MG1 and the loss L2 of the motor MG2 tend to be curved concave upward relative to the voltage VH. The loss LC of the boost converter 55 tends to increase linearly with an increase in the voltage VH. The overall loss L as shown in FIG. 8 may be obtained as the sum of the loss L1, the loss L2 and the loss LC.

The motor ECU 40 subsequently sets a minimum loss Ltmp that denotes a minimum value of the overall loss L in the ordinary boosting and a minimum loss-time boosting voltage (optimum boosting voltage) Vtmp that denotes the boosting voltage at the minimum loss Ltmp (step S210). In the illustrated example of FIG. 8, the overall loss L reaches the minimum at the voltage VH equal to a voltage V3. At step S210, the motor ECU 40 accordingly sets the voltage V3 to the minimum loss-time boosting voltage Vtmp and sets the overall loss L at the voltage V3 to the minimum loss Ltmp.

Figure 9:
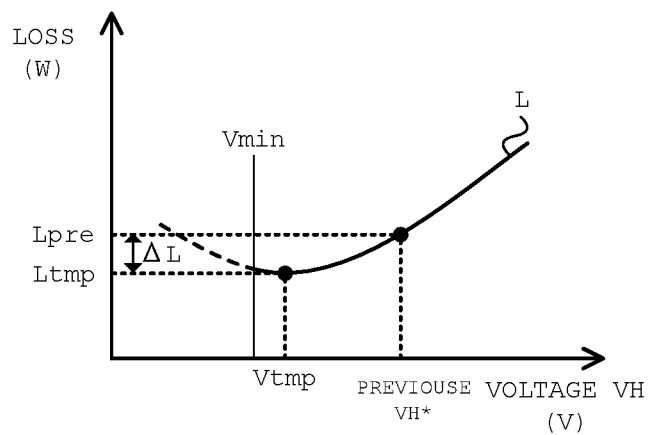
FIG. 9 is a diagram illustrating an example of loss reduction $\Delta L$.

After setting the minimum loss-time boosting voltage Vtmp and the minimum loss Ltmp, the motor ECU 40 determines a previous loss Lpre that denotes the overall loss L corresponding to a previous target voltage VH*, from the overall loss L of the present time (step S220). The motor ECU 40 subsequently calculates a loss reduction ΔL by subtracting the minimum loss Ltmp of the present time from the previous loss Lpre (step S230). FIG. 9 is a diagram illustrating an example of the loss reduction ΔL. In the illustrated example of FIG. 9, a loss corresponding to the previous target voltage VH* in the overall loss L of the present time is determined as the previous loss Lpre, and the difference between the previous loss Lpre and the minimum loss Ltmp of the present time is calculated as the loss reduction ΔL. The motor ECU 40 subsequently determines whether the calculated loss reduction ΔL is equal to or greater than a predetermined value Lref (step S240). When it is determined that the loss reduction ΔL is equal to or greater than the predetermined value Lref, the motor ECU 40 sets the minimum loss-time boosting voltage Vtmp of the present time to the target voltage VH* (step S250) and terminates this process. When it is determined that the loss reduction ΔL is less than the predetermined value Lref, on the other hand, the motor ECU 40 sets the previous target voltage VH* to the target voltage VH* or in other words, maintains the previous target voltage VH* (step S260) and terminates this process. As described above, the minimum loss-time boosting voltage Vtmp of the present time is set to the target voltage VH* only when the overall loss (minimum loss) Ltmp under control of the boost converter 55 at the minimum loss-time boosting voltage Vtmp of the present time becomes smaller than the overall loss (previous loss) Lpre under control of the boost converter 55 maintained at the previous target voltage VH* by the predetermined value Lref or more. Accordingly the target voltage VH* is changed only when the loss reducing effect is certainly expected.

Figure 10:
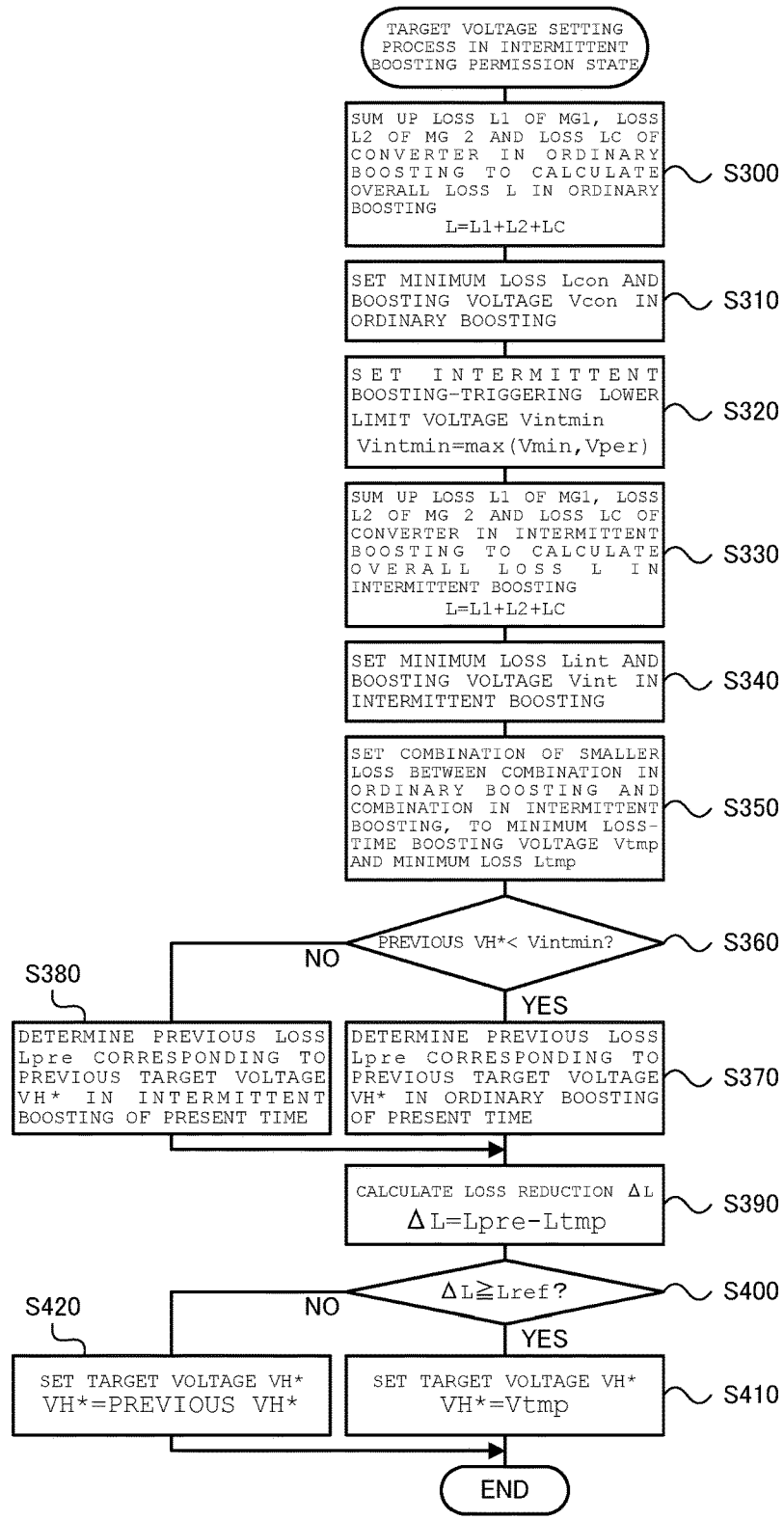
FIG. 10 is a flowchart showing an example of target voltage setting process in an intermittent boosting permission state.

The details of the target voltage setting process in the intermittent boosting permission state at step S130 in the boosting control routine of FIG. 3 are described next with reference to the flowchart of FIG. 10. In this target voltage setting process in the intermittent boosting permission state, the motor ECU 40 sums up the loss L1 of the motor MG1, the loss L2 of the motor MG2 and the loss LC of the boost converter 55 in the ordinary boosting, so as to calculate the overall loss L in the ordinary boosting (step S300) and sets a minimum loss Lcon that denotes a minimum value of the overall loss L in the ordinary boosting and a boosting voltage Vcon at the minimum loss Lcon (step S310) in a similar manner to that of steps S200 and S210 in the target voltage setting process in the ordinary boosting state shown in FIG. 4.

The motor ECU 40 subsequently sets the higher between the intermittent boosting permission voltage Vper described above and the lower limit drive voltage Vmin required to drive each of the motors MG1 and MG2 at its target drive point, to an intermittent boosting-triggering lower limit voltage Vintmin (step S320). The motor ECU 40 then sums up the loss L1 of the motor MG1, the loss L2 of the motor MG2 and a loss LC of the boost converter 55 in the intermittent boosting, so as to calculate an overall loss L in the intermittent boosting (step S330), and sets a minimum loss Lint that denotes a minimum value of the overall loss L in the intermittent boosting and a boosting voltage Vint at the minimum loss Lint (step S340). The loss L1 of the motor MG1 and the loss L2 of the motor MG2 may be determined in a similar manner to that of step S200 or step S300 and is thus not specifically described here.

Figure 11:
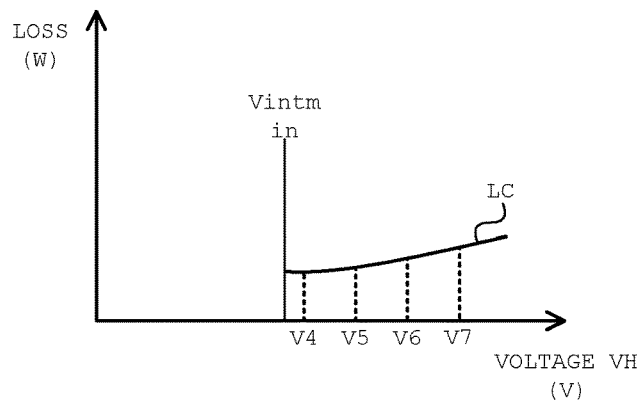
FIG. 11 is a diagram illustrating an example of relationship of the loss LC of the boost converter 55 to the voltage VH in intermittent boosting.
Figure 12:
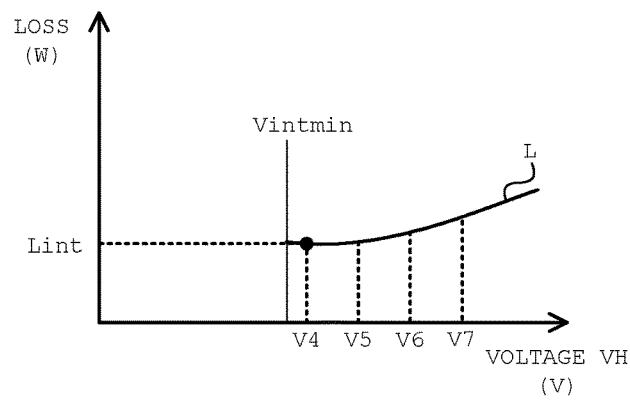
FIG. 12 is a diagram illustrating an example of relationship of the overall loss L to the voltage VH in the intermittent boosting.

FIG. 11 is a diagram illustrating an example of relationship of the loss LC of the boost converter 55 to the voltage VH in the intermittent boosting. FIG. 12 is a diagram illustrating an example of relationship of the overall loss L to the voltage VH in the intermittent boosting. FIGS. 11 and 12 show variations of the losses at the voltage of not lower than the intermittent boosting-triggering lower limit voltage Vintmin. As described above, with respect to the predetermined time period including the boosting operation terms and the stop terms, the intermittent boosting may be likely to reduce the loss, compared with the ordinary boosting. The values of the loss LC shown in FIG. 11 are accordingly smaller than the values of the loss LC shown in FIG. 7 at the same values of the voltage VH. The overall loss L in the intermittent boosting shown in FIG. 12 is thus likely to become smaller than the overall loss L in the ordinary boosting shown in FIG. 8. With respect to the loss LC of the boost converter 55 in the intermittent boosting, a map correlating the loss LC to the voltage in the intermittent boosting is determined in advance by experiment or the like and is stored in, for example, the ROM of the motor ECU 40. In the illustrated example of FIG. 12, the overall loss L reaches the minimum at the voltage VH equal to a voltage V4. At step S340, the motor ECU 40 accordingly sets the voltage V4 to the minimum loss-time boosting voltage Vtmp and sets the overall loss L at the voltage V4 to the minimum loss Ltmp.

Figure 13:
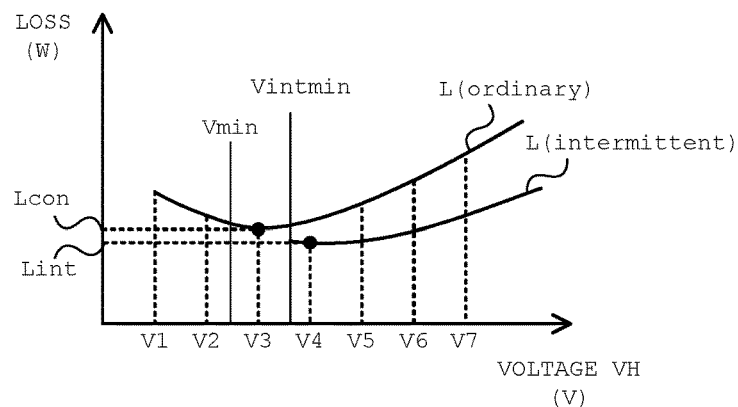
FIG. 13 is a diagram illustrating comparison between the overall loss L in the ordinary boosting and the overall loss L in the intermittent boosting.

The motor ECU 40 subsequently sets a combination that provides the smaller loss between the combination of the minimum loss Lcon and the boosting voltage Vcon in the ordinary boosting set at step S310 and the combination of the minimum loss Lint and the boosting voltage Vint in the intermittent boosting set at step S340, to the minimum loss-time boosting voltage Vtmp and the minimum loss Ltmp (step S350). FIG. 13 is a diagram illustrating comparison between the overall loss L in the ordinary boosting and the overall loss L in the intermittent boosting. In the illustrated example of FIG. 13, the minimum loss Lint in the intermittent boosting is smaller than the minimum loss Lcon in the ordinary boosting. At step S350, the motor ECU 40 accordingly sets the boosting voltage Vint (voltage V4 in the illustrated example) to the minimum loss-time boosting voltage Vtmp and sets the minimum loss Lint in the intermittent boosting to the minimum loss Ltmp.

Figure 14A:
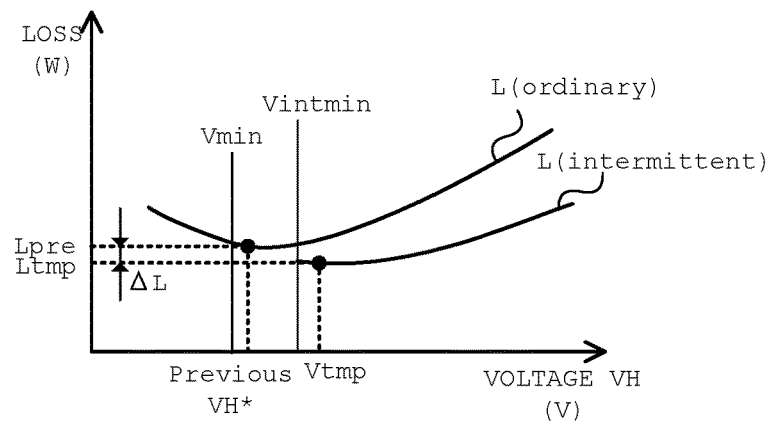
FIG. 14A is a diagram illustrating examples of the loss reduction $\Delta L$.
Figure 14B:
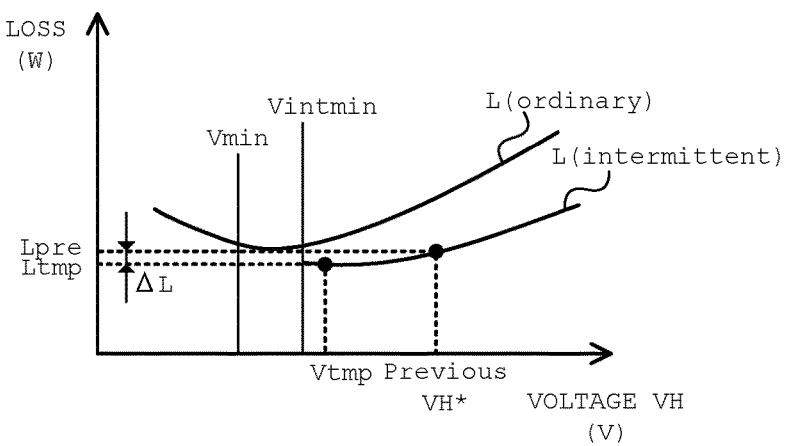
FIG. 14B is a diagram illustrating examples of the loss reduction ΔL.

After setting the minimum loss-time boosting voltage Vtmp and the minimum loss Ltmp, the motor ECU 40 determines whether the previous target voltage VH* is lower than the intermittent boosting-triggering lower limit voltage Vintmin set at step S320 (step S360). When it is determined that the previous target voltage VH* is lower than the intermittent boosting-triggering lower limit voltage Vintmin, the motor ECU 40 determines the previous loss Lpre that denotes the overall loss L corresponding to the previous target voltage VH*, from the overall loss L of the present time in the ordinary boosting calculated at step S300 (step S370). When it is determined that the previous target voltage VH* is equal to or higher than the intermittent boosting-triggering lower limit voltage Vintmin, on the other hand, the motor ECU 40 determines the previous loss Lpre that denotes the overall loss L corresponding to the previous target voltage VH*, from the overall loss L of the present time in the intermittent boosting calculated at step S330 (step S380). The motor ECU 40 subsequently calculates a loss reduction ΔL by subtracting the minimum loss Ltmp of the present time from the previous loss Lpre (step S390). FIGS. 14A and 14B are diagrams illustrating examples of the loss reduction ΔL. FIG. 14A illustrates an example when the previous target voltage VH* is lower than the intermittent boosting-triggering lower limit voltage Vintmin. In this illustrated example, a loss corresponding to the previous target voltage VH* in the overall loss L of the present time in the ordinary boosting is determined as the previous loss Lpre, and the difference between the previous loss Lpre and the minimum loss Ltmp of the present time is calculated as the loss reduction ΔL. FIG. 14B illustrates an example when the previous target voltage VH* is equal to or higher than the intermittent boosting-triggering lower limit voltage Vintmin. In this illustrated example, a loss corresponding to the previous target voltage VH* in the overall loss L of the present time in the intermittent boosting is determined as the previous loss Lpre, and the difference between the previous loss Lpre and the minimum loss Ltmp of the present time is calculated as the loss reduction ΔL. As described above, it is determined whether the previous loss Lpre corresponding to the previous target voltage VH* is to be determined from the overall loss L in the ordinary boosting or to be determined from the overall loss L in the intermittent boosting, based on whether the previous target voltage VH* is lower than the intermittent boosting-triggering lower limit voltage Vintmin. The overall loss L under control maintained at the previous target voltage VH* can thus be determined with high accuracy according to the presently calculated value of the overall loss L. This ensures the more appropriate calculation of the loss reduction ΔL.

The motor ECU 40 subsequently determines whether the calculated loss reduction ΔL is equal to or greater than a predetermined value Lref (step S400). When it is determined that the loss reduction ΔL is equal to or greater than the predetermined value Lref, the motor ECU 40 sets the minimum loss-time boosting voltage Vtmp of the present time to the target voltage VH* (step S410) and terminates this process. When it is determined that the loss reduction ΔL is less than the predetermined value Vref, on the other hand, the motor ECU 40 sets the previous target voltage VH* to the target voltage VH* or in other words, maintains the previous target voltage VH* (step S420) and terminates this process. As described above, the minimum loss-time boosting voltage Vtmp of the present time is set to the target voltage VH* only when the overall loss (minimum loss) Ltmp under control of the boost converter 55 at the minimum loss-time boosting voltage Vtmp of the present time becomes smaller than the overall loss (previous loss) Lpre under control of the boost converter 55 maintained at the previous target voltage VH* by the predetermined value Lref or more. Accordingly the target voltage VH* is changed only when the loss reducing effect is certainly expected. When the minimum loss-time boosting voltage Vtmp of the present time set to the target voltage VH* is equal to the boosting voltage Vint in the intermittent boosting or when the previous target voltage VH* is equal to the voltage in the intermittent boosting, the boost converter 55 is controlled by the intermittent boosting. When the minimum loss-time boosting voltage Vtmp of the present time set to the target voltage VH* is equal to the boosting voltage Vcon in the ordinary boosting or when the previous target voltage VH* is equal to the voltage in the ordinary boosting, on the other hand, the boost converter 55 is controlled by the ordinary boosting. In other words, when the minimum loss-time boosting voltage Vtmp of the present time is set to the target voltage VH*, the boost converter 55 is controlled in the control state corresponding to the minimum loss-time boosting voltage Vtmp. Only when the loss reduction ΔL is equal to or greater than the predetermined value Lref (i.e., only when the loss reducing effect is certainly expected), the target voltage VH* is changed. When the loss reduction ΔL is less than the predetermined value Lref, on the other hand, the previous target voltage VH* is maintained, so that the control state (execution or non-execution of the intermittent boosting) is maintained. This configuration prevents the control state (execution or non-execution of the intermittent boosting) from being frequently changed over when the loss reducing effect is not certain expected.

The hybrid vehicle 20 of the embodiment described above calculates the overall loss L from the loss L1 of the motor MG1, the loss L2 of the motor MG2 and the loss LC of the boost converter 55 during non-execution of the intermittent boosting (i.e., in the ordinary boosting or continuous boosting). The hybrid vehicle 20 also calculates the overall loss L from the loss L1 of the motor MG1, the loss L2 of the motor MG2 and the loss LC of the boost converter 55 during execution of the intermittent boosting. The hybrid vehicle 20 subsequently sets the minimum loss-time boosting voltage Vtmp at which the calculated overall loss L is equal to the minimum loss Ltmp. The hybrid vehicle 20 then sets the minimum loss-time boosting voltage Vtmp to the target voltage VH* and controls the boost converter 55 in the control state corresponding to the minimum loss-time boosting voltage Vtmp (target voltage VH*). This configuration sets the target voltage VH* such as to minimize the overall loss L that includes the loss L1 of the motor MG1 and the loss L2 of the motor MG2 as well as the loss LC of the boost converter 55, and controls the boost converter 55. This configuration ensures a further reduction of the loss.

According to the embodiment, the minimum loss-time boosting voltage Vtmp is set, based on at least one of the overall loss L during non-execution of the intermittent boosting and the overall loss L during execution of the intermittent boosting, only when the intermittent boosting is being performed or when the intermittent boosting is expected to be performed (i.e., when the intermittent boosting is likely to be performed). When the intermittent boosting is not being performed and the intermittent boosting is not expected to be performed, this configuration prevents the minimum loss-time boosting voltage Vtmp on the premise of execution of the intermittent boosting from being set to the target voltage VH* and thereby suppresses a potential deterioration of the loss.

According to this embodiment, when the minimum loss Ltmp is smaller than the previous loss Lpre by the predetermined value Lref or more, the minimum loss-time boosting voltage Vtmp is newly set to the target voltage VH*. When the minimum loss Ltmp is not smaller than the previous loss Lpre by the predetermined value Lref or more, on the other hand, the previous target voltage VH* is maintained. This configuration changes the target voltage VH* only when a reduction of the loss is certainly expected and thereby ensures a more effective reduction of the loss. This configuration also suppresses frequent changeover of the target voltage VH* and frequent changeover between execution and non-execution of the intermittent boosting and thereby suppresses deterioration of the drive feeling.

According to this embodiment, the higher between the intermittent boosting permission voltage Vper and the lower limit drive voltage Vmin is set to the intermittent boosting-triggering lower limit voltage Vintmin. When the previous target voltage VH* is lower than the intermittent boosting-triggering lower limit voltage Vintmin, the previous loss Lpre is determined from the overall loss L during non-execution of the intermittent boosting (i.e., in the ordinary boosting). When the previous target voltage VH* is equal to or higher than the intermittent boosting-triggering lower limit voltage Vintmin, on the other hand, the previous loss Lpre is determined from the overall loss L during execution of the intermittent boosting. This configuration ensures determination of the previous loss Lpre with higher accuracy. This more appropriately determines whether the target voltage VH* is to be changed over to the optimum boosting voltage Vtmp of the present time and thereby ensures an effective reduction of the loss.

The hybrid vehicle 20 of the embodiment is configured to perform the target voltage setting process in the ordinary boosting state shown in FIG. 3 when the intermittent boosting is not being performed and the intermittent boosting is not expected to be performed. The hybrid vehicle 20 of the embodiment is also configured to perform the target voltage setting process in the intermittent boosting permission state shown in FIG. 10, on the other hand, when the intermittent boosting is being performed or when the intermittent boosting is expected to be performed. The present disclosure is, however, not limited to this configuration. Any configuration may be employed to perform the target voltage setting process in the intermittent boosting permission state shown in FIG. 10 only when the intermittent boosting is being performed or when the intermittent boosting is expected to be performed. According to a modification, the target voltage setting process in the intermittent boosting permission state shown in FIG. 10 may be performed to set the minimum loss-time boosting voltage Vtmp at which the overall loss L reaches the minimum, to the target voltage VH*, regardless of whether the intermittent boosting is being performed or not and whether the intermittent boosting is expected to be performed or not.

The hybrid vehicle 20 of the embodiment is configured to set the minimum loss-time boosting voltage Vtmp to the target voltage VH* when the minimum loss Ltmp is smaller than the previous loss Lpre by the predetermined value Lref or more. The present disclosure is, however, not limited to this configuration. For example, according to a modification, when the minimum loss Ltmp is smaller than the previous loss Lpre, the minimum loss-time boosting voltage Vtmp may be set to the target voltage VH*. According to another modification, in the case where the control state (execution or non-execution of the intermittent boosting) is changed over, the minimum loss-time boosting voltage Vtmp may be set to the target voltage VH* when the minimum loss Ltmp is smaller than the previous loss Lpre by a first predetermined value Lref1 or more. In the case where the control state (execution or non-execution of the intermittent boosting) is not changed over, on the other hand, for example, the minimum loss-time boosting voltage Vtmp may be set to the target voltage VH* when the minimum loss Ltmp is smaller than the previous loss Lpre. In another example, in this case, the minimum loss-time boosting voltage Vtmp may be set to the target voltage VH* when the minimum loss Ltmp is smaller than the previous loss Lpre by a second predetermined value Lref2 or more. This second predetermined value Lref2 may be a smaller value than the first predetermined value Lref1. These modified configurations are more likely to set the target voltage VH* that provides the smaller loss and thereby ensures an effective reduction of the loss, while preventing a frequent changeover between execution and non-execution of the intermittent boosting.

The hybrid vehicle 20 of the embodiment is configured to make a comparison between the previous target voltage VH* and the intermittent boosting-triggering lower limit voltage Vintmin. When the previous target voltage VH* is lower than the intermittent boosting-triggering lower limit voltage Vintmin, the previous loss Lpre is determined from the overall loss L during non-execution of the intermittent boosting (i.e., in the ordinary boosting). When the previous target voltage VH* is equal to or higher than the intermittent boosting-triggering lower limit voltage Vintmin, on the other hand, the previous loss Lpre is determined from the overall loss L during execution of the intermittent boosting. The present disclosure is, however, not limited to this configuration. For example, according to a modification, a comparison may be made between the previous target voltage VH* and the intermittent boosting permission voltage Vper, in place of the intermittent boosting-triggering lower limit voltage Vintmin. When the previous target voltage VH* is lower than the intermittent boosting permission voltage Vper, the previous loss Lpre may be determined from the overall loss L during non-execution of the intermittent boosting (i.e., in the ordinary boosting). When the previous target voltage VH* is equal to or higher than the intermittent boosting permission voltage Vper, on the other hand, the previous loss Lpre may be determined from the overall loss L during execution of the intermittent boosting. The previous loss Lpre may not be necessarily determined from the presently calculated value of the overall loss L, but the overall loss L calculated at the time of setting the previous target voltage VH* may be used as the previous loss Lpre.

The hybrid vehicle 20 of the embodiment is configured to include the engine 22, the motors MG1 and MG2, the battery 50 and the boost converter 55. The present disclosure is, however, not limited to this configuration but may be applied to another configuration. The vehicle of the present disclosure may be any vehicle that includes at least one motor for driving, a battery, and a boost converter configured to step up the voltage of the battery and supply the stepped-up voltage to the motor and may be, for example, a hybrid vehicle or an electric vehicle.

In the hybrid vehicle of the above aspect, wherein only when the intermittent boosting is being performed or when the intermittent boosting is likely to be performed, the controller may set the minimum loss-time boosting voltage to the target voltage and controls the boost converter in the control state corresponding to the minimum loss-time boosting voltage, based on the overall loss during non-execution of the intermittent boosting and the overall loss during execution of the intermittent boosting. When the intermittent boosting is not being performed and the intermittent boosting is unlikely to be performed, this configuration prevents the minimum loss-time boosting voltage on the premise of execution of the intermittent boosting from being set to the target voltage and thereby suppresses a potential deterioration of the loss. It may be determined that the intermittent boosting is likely to be performed, for example, when the power input from and output to the motor is less than a predetermined power. When the intermittent boosting is not being performed and the intermittent boosting is unlikely to be performed, the controller may be programmed to set the minimum loss-time boosting voltage to the target voltage and control the boost converter in the control state corresponding to the minimum loss-time boosting voltage, based on the overall loss during non-execution of the intermittent boosting.

In the hybrid vehicle of the above aspect, wherein when a minimum value of the overall loss is smaller than a previous value of the overall loss corresponding to a previous value of the target voltage by a predetermined value or more, the controller may set the minimum loss-time boosting voltage to the target voltage and control the boost converter in the control state corresponding to the minimum loss-time boosting voltage, and when the minimum value of the overall loss is not smaller than the previous value of the overall loss corresponding to the previous value of the target voltage by the predetermined value or more, the controller may maintain the previous value of the target voltage and a previous control state to control the boost converter. This configuration changes the target voltage only when a reduction of the loss of not less than the predetermined value is expected. This ensures a more effective reduction of the loss. This also suppresses a potential disadvantage caused by a frequent change of the target voltage or frequent changeover between execution and non-execution of the intermittent boosting, for example, deterioration of drive feeling.

In the hybrid vehicle of the above aspect, wherein the controller may set a higher voltage between a value of the boosting voltage that permits execution of the intermittent boosting and a value of the boosting voltage required to drive the motor at the target drive point, to an intermittent boosting-triggering lower limit voltage in intermittent boosting, and when the previous value of the target voltage is lower than the intermittent boosting-triggering lower limit voltage, the controller may determine the previous value of the overall loss corresponding to the previous value of the target voltage from the overall loss during non-execution of the intermittent boosting, and when the previous value of the target voltage is equal to or higher than the intermittent boosting-triggering lower limit voltage, the controller may determine the previous value of the overall loss corresponding to the previous value of the target voltage from the overall loss during execution of the intermittent boosting. This configuration enables the previous value of the overall loss to be adequately determined according to the previous value of the target voltage. This more appropriately determines whether the target voltage is to be changed from the previous value of the target voltage to the minimum loss-time boosting voltage of the present time and ensures an effective reduction of the loss.

The following describes the correspondence relationship between the primary components of the embodiments and the primary components of the disclosure described in Summary. The motor MG1 and the motor MG2 of the embodiment correspond to the "motor" in the claims, the battery 50 corresponds to the "battery". The boost converter 55 corresponds to the "boost converter". The HVECU 70 and the motor ECU 40 that perform the boosting control routine of FIG. 3 (or more specifically, the target voltage setting process in the intermittent boosting permission state of FIG. 10) correspond to the "controller".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The present disclosure is applicable to the manufacturing industries of vehicle.

The invention claimed is:

1. A vehicle, comprising:
   at least one motor for driving;
   a battery;
   a boost converter configured to step up a voltage of the battery and supply the stepped-up voltage to the motor; and
   a controller programmed to control the boost converter such that the boost converter makes a boosting voltage equal to a target voltage in either of a control state that performs intermittent boosting to intermittently operate the boost converter and a control state that continuously operates the boost converter and does not perform the intermittent boosting, wherein
   the controller sets a minimum loss-time boosting voltage at which an overall loss reaches a minimum, to the target voltage and controls the boost converter in a control state corresponding to the minimum loss-time boosting voltage, based on the overall loss that includes a loss of the motor at a target drive point and a loss of the boost converter during non-execution of the intermittent boosting and the overall loss during execution of the intermittent boosting,
   wherein only when the intermittent boosting is being performed or when the intermittent boosting is likely to be performed, the controller sets the minimum loss-time boosting voltage to the target voltage and controls the boost converter in the control state corresponding to the minimum loss-time boosting voltage, based on the overall loss during non-execution of the intermittent boosting and the overall loss during execution of the intermittent boosting.

2. A vehicle, comprising:
   at least one motor for driving;
   a battery;
   a boost converter configured to step up a voltage of the battery and supply the stepped-up voltage to the motor; and
   a controller programmed to control the boost converter such that the boost converter makes a boosting voltage equal to a target voltage in either of a control state that performs intermittent boosting to intermittently operate the boost converter and a control state that continuously operates the boost converter and does not perform the intermittent boosting, wherein
   the controller sets a minimum loss-time boosting voltage at which an overall loss reaches a minimum, to the target voltage and controls the boost converter in a control state corresponding to the minimum loss-time boosting voltage, based on the overall loss that includes a loss of the motor at a target drive point and a loss of the boost converter during non-execution of the intermittent boosting and the overall loss during execution of the intermittent boosting
   wherein when a minimum value of the overall loss is smaller than a previous value of the overall loss corresponding to a previous value of the target voltage by a predetermined value or more, the controller sets the minimum loss-time boosting voltage to the target voltage and controls the boost converter in the control state corresponding to the minimum loss-time boosting voltage, and
   when the minimum value of the overall loss is not smaller than the previous value of the overall loss corresponding to the previous value of the target voltage by the predetermined value or more, the controller maintains the previous value of the target voltage and a previous control state to control the boost converter.

3. The vehicle according to claim 2,
   wherein the controller sets a higher voltage between a value of the boosting voltage that permits execution of the intermittent boosting and a value of the boosting voltage required to drive the motor at the target drive point, to an intermittent boosting-triggering lower limit voltage, and
   when the previous value of the target voltage is lower than the intermittent boosting-triggering lower limit voltage in intermittent boosting, the controller determines the previous value of the overall loss corresponding to the previous value of the target voltage from the overall loss during non-execution of the intermittent boosting, and
   when the previous value of the target voltage is equal to or higher than the intermittent boosting-triggering lower limit voltage, the controller determines the previous value of the overall loss corresponding to the previous value of the target voltage from the overall loss during execution of the intermittent boosting.

* * * * *